United States Patent [19]

Nishiyama

[11] 4,097,131
[45] Jun. 27, 1978

[54] REFLECTIVE TYPE LIQUID CRYSTAL DISPLAY

[75] Inventor: Mitsuru Nishiyama, Nara, Japan

[73] Assignee: Sharp Kabushiki Kaisha, Osaka, Japan

[21] Appl. No.: 744,775

[22] Filed: Nov. 24, 1976

[30] Foreign Application Priority Data

Nov. 28, 1975 Japan .......................... 50-163399[U]

[51] Int. Cl.² ............................................... G02F 1/13
[52] U.S. Cl. ...................................... 350/338; 350/339
[58] Field of Search .................................. 350/160 LC

[56] References Cited

U.S. PATENT DOCUMENTS

| | | | |
|---|---|---|---|
| 3,700,306 | 10/1972 | Cartmell et al. ........... | 350/160 LC X |
| 3,814,501 | 6/1974 | Schindler ..................... | 350/160 LC |
| 3,914,019 | 10/1975 | Byatt ........................... | 350/160 LC |
| 3,966,305 | 6/1976 | Young ......................... | 350/160 LC |

*Primary Examiner*—Edward S. Bauer
*Attorney, Agent, or Firm*—Birch, Stewart, Kolasch & Birch

[57] ABSTRACT

In a reflective type liquid crystal display comprising a rear support plate carrying a segmented reflective electrode in a predetermined display region, a front support plate carrying a transparent electrode of indium oxide at least in a region corresponding to the reflective electrode and a reflective coating of aluminum in a region except the region corresponding to the reflective electrode, and a liquid crystal composition sandwiched between the two support plates, there is provided an intermediate layer made of a material selected from the group consisting of magnesium fluoride, thorium fluoride, silicon dioxide, silicon monoxide, cerium oxide and magnesium oxide intermediate the indium oxide transparent electrode deposited on at least the region corresponding to the reflective electrode and the aluminum reflective coating deposited on the region except the region corresponding to the reflector electrode.

4 Claims, 2 Drawing Figures

REFLECTIVE TYPE LIQUID CRYSTAL DISPLAY

BACKGROUND OF THE INVENTION

The present invention relates to a liquid crystal display, and more particularly to a reflective type liquid crystal display.

As is well known in the art of displays, the reflective type of liquid crystal displays that contain a liquid crystal composition sandwiched between a reflector electrode bearing a rear support plate and a transparent electrode bearing a front support plate provide a visual display of desired symbols by a change in the optical characteristics of the liquid crystal composition, for example, the so-called dynamic scattering effects caused by voltage selectively applied across the both electrodes, namely, a variation in a contrast ratio in reflected light in the dynamic scattering.

However, with such an arrangement, legibility of the resulting visual display is not good since the viewer's eye may be caught more or less by the shape of the segmented reflective electrode.

Accordingly, it is an object of the present invention to provide an improved reflective type liquid crystal display capable of making the display more readable.

BRIEF DESCRIPTION OF THE DRAWINGS

A better understanding of the invention may be had from a consideration of the following detailed description taken in conjunction with the accompanying drawings in which.

DETAILED DESCRIPTION OF THE INVENTION

Figure 1:
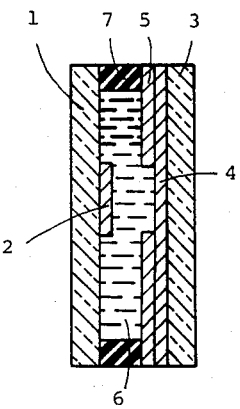
FIG. 1 is a cross sectional view of a typical prior art reflective type liquid crystal display.

Before discussing the present invention in greater detail, it may be of advantage to describe briefly a typical prior art device as shown in FIG. 1.

On a rear support plate of glass 1 there is formed a segmented reflective electrode 2 of aluminum having a predetermined display pattern. A front support plate of glass 3 is provided with a transparent electrode 4 of indium oxide which in turn is spaced from the segmented reflective electrode 2. While in the illustrative example, the transparent electrode 4 is deposited on the entire region of the front support plate 3, it may be deposited at least on a defined region corresponding to the reflective electrode 2.

As well, a reflective coating 5 of aluminum is deposited in the remaining region of the transparent electrode 4 except in the defined region corresponding to the reflective electrode 2. A liquid crystal composition 6 is injected between the two electrodes and held with aid of a spacer member 7.

The above noted problem is appreciably avoided if only the layout of the reflective electrode comes in the viewer's sight, because the active surface of the display stands at a uniform mirror state.

Meantime, the results of the inventor's investigation reveal that the reflective type liquid crystal display shown in FIG. 1 still faces the following problems.

(1) Because the aluminum reflective coating 5 is not in intimate engagement with the indium oxide layer 4, the aluminum reflective coating 5 will separate therefrom and pin holes will occur easily.

(2) The aluminum atoms in the aluminum reflective coating 5 tend to reduce the indium oxide layer 4 because of its active nature, cf. a chemical equation as defined below. For this reason, metal indium is formed about the interface between the two coatings 4 and 5 to thereby damage the optical characteristics of the transparent electrode due to its absorption color of the metal indium. In addition, the formation of the metal indium makes the resistance of the indium oxide layer 4 unstable.

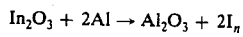
$$In_2O_3 + 2Al \rightarrow Al_2O_3 + 2I_n$$

In view of the foregoing, the inventor's effort is devoted to overcome the above discussed problems. According to the teachings of the present invention, these problems are avoided by interposition of a transparent insulator coating made of magnesium fluoride, thorium fluoride, silicon dioxide, silicon monoxide, cerium oxide, magnesium oxide, etc., between the aluminum reflective coating and the indium oxide coating (transparent electrode).

To overcome the shortcomings experienced in the prior art device and enhance the optical characteristics in the liquid crystal display, in accordance with the present invention, there is provided an improved reflective type liquid crystal display wherein a transparent electrode to be spaced against a reflective electrode (or a reflective coating having no region corresponding to the reflective electrode) is first deposited on a front support plate and the reflective coating having no region corresponding to the reflective electrode (or the transparent electrode corresponding to the reflective electrode) is subsequently deposited via the transparent insulator layer of magnesium fluoride, silicon dioxide, etc.

Figure 2:
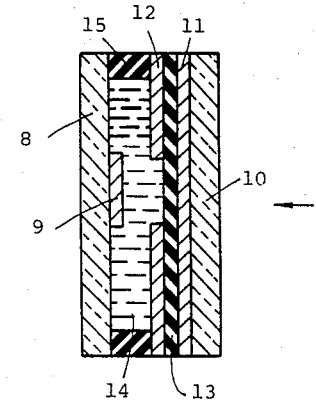
FIG. 2 is a cross sectional view of one preferred form of a reflective type liquid crystal display embodying the present invention.

Referring now to FIG. 2 illustrating a cross sectional view of one preferred form of the reflective type liquid crystal display embodying the present invention, a rear support plate 8 of glass is provided with a segmented reflective electrode 9 of aluminum defining a predetermined display pattern. A front support plate 10 of glass material is provided in a spaced relationship against the rear support plate 8. A transparent electrode 11 of indium oxide is deposited over an entire area of the front glass plate 10.

In accordance with the present invention, a reflective coating 12 of aluminum having no region corresponding to the reflective electrode 9 is deposited on the transparent electrode via the intermediate layer 13 of magnesium fluoride.

A liquid crystal composition 14 is injected between the two support plates while keeping a fixed distance therebetween with aid of a spacer member 15.

The reflective electrode, the reflective coating, the transparent electrode and the intermediate layer may be formed in accordance with well known deposition techniques. It is preferred that the thickness of the magnesium fluoride intermediate layer is 300 through 400 A. If the thickness of the intermediate insulator layer 13 is increased beyond the above noted values, voltage drop will occur due to the capacitance and the resistance of the magnesium fluoride intermediate layer. This means that a voltage across the liquid crystal composition will be reduced to thereby impede the display performance. On the other hand, the thickness of the intermediate layer 13 below the above noted values will weaken engagement with the aluminum reflective coating.

The provision of the magnesium fluoride intermediate layer can preclude the chemical reaction ($In_2O_3 + 2Al \rightarrow Al_2O_3 + 2I_n$) and thus improve the optical characteristics of the liquid crystal display. Although it is obvious that the resistance stability of the indium oxide layer is attained by the provision of the magnesium fluoride layer, variations in the resistance are further minimized because of the capability of precluding the chemical reaction. The same advantages also are obtainable in case of other fluorides such as thorium fluoride.

Another preferred from of the intermediate insulator layer is a molten quartz coating (that is, silicon dioxide) formed in accordance with an electron beam deposition method. Likewise, the provision of the molten quartz intermediate layer can preclude the chemical reaction ($In_2O_3 + 2Al \rightarrow Al_2O_3 + 2I_n$) and improve the optical characteristics of the display and ensure the resistance stability of the indium oxide layer. Since adherence between the aluminum layer and the silicon dioxide layer is extremely tight, the problems associated with separation of the aluminum layer and occurrence of pin holes are completely overcome. A coating of silicon monoxide may be deposited as the intermediate layer by a resistor heating method instead of utilizing the molten quartz layer. The intermediate layer may be made of other oxides such as cerium oxide and magnesium oxide. While in the given examples the intermediate layer is deposited in the region in which the reflective coating is not deposited, the intermediate layer in that region is not necessarily required. In this instance, the liquid crystal display will be free from any limitations caused by the thickness of the intermediate layer. It will be noted that the intermediate layer may be deposited by spraying, printing or painting techniques in addition to conventional vacuum deposition techniques.

As stated above, in accordance with the present invention the transparent insulator layer of a material is selected from the group consisting of magnesium fluoride, thorium fluoride, silicon dioxide, silicon monoxide, cerium oxide and magnesium oxide is provided between the indium oxide transparent electrode layer and the aluminum reflective coating to remove the chemical reaction ($2Al + In_2O_3 \rightarrow 2In + Al_2I_3$) experienced in the prior art. This results in that a reduction in the transparency of the transparent electrode is previously prevented to thereby ensure a uniform mirror surface state.

While particular representative embodiments and details have been shown for the purpose of illustrating the present invention, it will be apparent to those skilled in this art that various changes and modifications may be made without departing from the spirit or scope of the invention. Accordingly, the foregoing embodiments are not to be taken as delimiting examples but as exemplary structures of the invention defined in the claims.

What is claimed is:
1. A reflective type liquid crystal display comprising:
first and second support plates;
a segmented reflective electrode deposited on said first support plate;
a transparent electrode deposited on said second support plate;
a reflective coating deposited on said second support plate in a region except the region corresponding to said reflective electrode;
an intermediate layer of insulator material interposed between said transparent electrode and said reflective coating, said intermediate layer being capable of preventing a chemical reaction about the interface between said transparent electrode and said reflective coating; and
a liquid crystal composition sandwiched between said first and said second support plates.
2. A reflective type liquid crystal display comprising:
first and second support plates made of glass;
an aluminuim segmented reflective electrode deposited in a display region on said first support plate;
an indium oxide transparent electrode deposited in at least a display region corresponding to that of the aluminum reflective electrode on said second support plate;
an aluminum reflective coating in a region except the display region corresponding to the aluminum reflective electrode;
an intermediate insulator layer made of a material selected from the group consisting of magnesium fluoride, thorium fluoride, silicon dioxide, silicon monoxide, cerium oxide and magnesium oxide and interposed between said indium oxide transparent electrode and said aluminum reflective coating, said intermediate layer being capable of preventing a chemical reaction about the interface between said indium oxide transparent electrode and said aluminum reflective coating; and
a liquid crystal composition sandwiched between said first and said second support plates.
3. The reflective type liquid crystal display as set forth in claim 1 wherein the thickness of the intermediate layer is 300 – 400 A.
4. A reflective type liquid crystal display comprising first and second support plates, a liquid crystal composition, a reflective electrode carried on the first support plate and a transparent electrode carried on the second support plate, characterized in that a reflective coating having no region corresponding to the reflective electrode is deposited on the second support plate via a transparent insulator layer made of fluoride material or oxide material capable of preventing a chemical reaction about the interface between the transparent electrode and the reflective coating.

* * * * *